(12) United States Patent
Chen et al.

(10) Patent No.: US 9,715,638 B1
(45) Date of Patent: Jul. 25, 2017

(54) METHOD AND APPARATUS FOR IDENTIFYING SALIENT SUBIMAGES WITHIN A PANORAMIC IMAGE

(71) Applicant: Nokia Technologies Oy, Espoo (FI)

(72) Inventors: Lin Chen, Sunnyvale, CA (US); Basavaraja Shanthappa Vandrotti, Sunnyvale, CA (US); Daniel Vaquero, Sunnyvale, CA (US)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/985,866

(22) Filed: Dec. 31, 2015

(51) Int. Cl.
*G06K 9/00* (2006.01)
*G06K 9/46* (2006.01)
*G06T 7/00* (2017.01)

(52) U.S. Cl.
CPC .......... *G06K 9/4671* (2013.01); *G06T 7/0081* (2013.01); *G06T 2207/20164* (2013.01)

(58) Field of Classification Search
CPC .... G06K 9/00765; G06K 9/3233; G06K 9/34; G06K 9/342; G06K 9/46; G06K 9/4604; G06K 9/4608; G06K 9/4638; G06K 9/4671; G06K 9/4676; G06K 9/52; G06K 9/6206; G06K 9/628–9/6293; G06K 9/72; G06K 2009/2045; G06K 2009/6294–2009/6295; G06K 9/4628; G06T 3/0012; G06T 3/0025; G06T 3/4038; G06T 5/50; G06T 7/0022; G06T 7/0065–7/0077; G06T 7/0079; G06T 7/0081; G06T 7/0089; G06T 15/205; G06T 17/00–17/005; G06T 19/003; G06T 2200/32; G06T 2207/10012; G06T 2207/10021; G06T 2207/20021; G06T 2207/20164; G06T 2207/20221; G06T 2207/30; G06T 2215/12–2215/16; G06T 2200/04; G06T 7/0028; G06T 3/0018; G06T 3/0062; G06T 7/204; G06T 7/97;
(Continued)

(56) References Cited

U.S. PATENT DOCUMENTS

| | | | |
|---|---|---|---|
| 7,015,954 B1 | 3/2006 | Foote et al. | |
| 7,940,264 B2 * | 5/2011 | Jojic | G06T 7/2006 |
| | | | 345/420 |

(Continued)

OTHER PUBLICATIONS

Argyriou, A. et al., *Convex Multi-Task Feature Larning*, Mach. Learn. 73, 3 (Dec. 2008) 243-272.
(Continued)

*Primary Examiner* — Jose Couso
(74) *Attorney, Agent, or Firm* — Alston & Bird LLP

(57) ABSTRACT

A method, apparatus and computer program product are provided to facilitate the review of at least portions of a panoramic image and to increase the likelihood that a viewer consumes at least those portions of the panoramic image that are considered to be both interesting and of aesthetic value. In the context of a method, one or more regions within a panoramic image are identified based upon a saliency of the one or more regions. The method also includes identifying candidate subimages that at least partially overlap with at least one of the regions identified within the panoramic image. The method further includes scoring the candidate subimages based upon predefined criteria and causing information for one or more of the candidate subimages to be provided based upon scores associated therewith.

16 Claims, 6 Drawing Sheets

(58) Field of Classification Search
CPC ...... G06T 2207/20228; H04N 1/00442; H04N 5/23238; H04N 5/2628–5/265; H04N 5/3415; H04N 13/0282; H04N 19/23; H04N 13/0011; H04N 13/0014; H04N 13/0048; H04N 13/026; H04N 13/0271; H04N 19/54; H04N 19/597; H04N 2013/0088; H04N 13/0242; H04N 13/0239; H04N 13/007; H04N 13/0022; H04N 13/0059; H04N 13/044; H04N 5/247; H04N 5/232; H04N 5/23206; H04N 7/181; H04N 2013/0081; G03B 37/00–37/06; G03B 35/08; G06F 3/04842; G06F 3/04815; G06F 3/04847; G02B 2027/0134

See application file for complete search history.

(56) References Cited

U.S. PATENT DOCUMENTS

| | | | | |
|---|---|---|---|---|
| 8,018,493 | B2* | 9/2011 | Sakaue | B41J 2/175 348/207.2 |
| 8,401,979 | B2 | 3/2013 | Zhang et al. | |
| 8,417,058 | B2 | 4/2013 | Tardif | |
| 8,811,711 | B2 | 8/2014 | Calman et al. | |
| 8,990,128 | B2 | 3/2015 | He et al. | |
| 9,224,036 | B2* | 12/2015 | Horowitz | G06K 9/00335 |
| 2007/0024701 | A1 | 2/2007 | Prechtl et al. | |
| 2010/0086200 | A1 | 4/2010 | Stankiewicz et al. | |
| 2010/0329588 | A1 | 12/2010 | Cheatle | |
| 2011/0287811 | A1 | 11/2011 | Mattila et al. | |
| 2013/0124951 | A1 | 5/2013 | Shechtman et al. | |
| 2013/0294709 | A1 | 11/2013 | Bogart et al. | |
| 2014/0354768 | A1 | 12/2014 | Mei et al. | |
| 2015/0054913 | A1 | 2/2015 | Annau et al. | |
| 2015/0117783 | A1 | 4/2015 | Lin et al. | |
| 2015/0130799 | A1 | 5/2015 | Holzer et al. | |
| 2015/0269785 | A1 | 9/2015 | Bell et al. | |
| 2015/0379086 | A1 | 12/2015 | Sheridan et al. | |

OTHER PUBLICATIONS

Chang, Y.-Y. et al., *Finding Good Composition in Panoramic Images*, International Conference on Computer Vision (2009) 2225-2231.

Fang, C. et al., *Automatic Image Cropping Using Visual Composition, Boundary Simplicity and Content Preservation Models*, MM'14 (Nov. 2014) 4 pages.

Fenzi, M. et al., *Class Generative Models Based on Feature Regression for Pose Estimation of Object Categories*, CVPR2013 Paper (2013) 755-762.

Gaddam, V. R. et al., *Automatic Real-Time Zooming and Panning on Salient Objects From a Panoramic Video*, MM'14 (Nov. 2014) 725-726.

Gehler, P. et al., *On Feature Combination for Multiclass Object Classification*, IEEE (2009), 8 pages.

Goferman, S. et al., *Content-Aware Saliency Detection*, IEEE Trans. Pattern Anal. Mach. Intell. 34, 10 (Oct. 2012) 1915-1926.

Jayaraman, D. et al., *Decorrelating Semantic Fisual Attributes by Resisting the Urge to Share*, In Proc. of CVPR'14 (2014) 8 pages.

Liu, J. et al., *Multi-view Clustering Via Joint Nonnegative Matric Factorization*, Proc. of SDM 13 (2013) 252-260.

Marchesotti, L. et al., *Assessing the Aethetic Quality of Photographs Using Generic Image Descriptors*, International Conference on Computer Vision (ICCV'11) (2011) 1784-1791.

Shin, Y-D. et al., *A Method for Identifying Photo Composition of the Panoramic Image*, Proceedings of the International MultiConference of Engineers and Computer Scientists 2015 vol. 1, IMECS 2015 (Mar. 2015) 8 pages.

Torralba, A. et al., *Sharing Visual Features for Multiclass and Multiview Object Detection*, In Press, IEEE Transactions on Pattern Analysis and Machine Intelligence (2007) 1-16.

Zha, Z.-J. et al., *Robust Mulktiview Feature Learning for RGB-D Image Understanding*, ACM Transactions on Intelligent Systems and Technology, vol. 6, No. 2, Article 15 (Mar. 2015) pp. 15:1-15:19.

Yuan, X-T. et al., *Visual Classification With Multitask Joint Sparse Representation*, IEEE Transactions on Image Processing, vol. 21, No. 10 (Oct. 2012) 4349-4360.

Camera Calibration and 3D Reconstruction [online] [retrieved Mar. 7, 2016]. Retrieved from the Internet: <URL: http://docs.opencv.org/2.4/modules/calib3d/doc/camera_calibration_and_3d_reconstruction.html>. 35 pages.

CENTR: An Embedded Vision Case Study Winner [online] [retrieved Oct. 20, 2015]. Retrieved from the Internet: <URL: http://www.embedded-vision.com/industry-analysis/technical-articles/2014/05/13/centr-embedded-vision-case-study-winner>. 4 pages.

Geonaute Mountable Action Camera Records 360-degree Video [online] [retrieved Oct. 20, 2015]. Retrieved from the Internet: <URL: http://www.gizmag.com/geonaute-action-camera-360-degree-ces/25747/>. 7 pages.

Lucid—World's First Consumer Camera for VR—LucidCam [online] [retrieved Mar. 8, 2016] Retrieved from the Internet: <URL: http://www.lucidcam.com>. 7 pages.

International Search Report and Written Opinion for International Application No. PCT/IB2016/057951 dated Apr. 5, 2017.

Ke, Xiao, Guo, Wenzhong; "Multi-Scale Salient Region and Relevant Visual Keywords Based Model for Automatic Image Annotation"; Multimedia Tools and Applications, (2016) 75:12477-12498.

Yigitsoy, Mehmet; Navab, Nassir; "Structure Propagation for Image Registration"; IEEE Transactions on Medical Imaging; vol. 32, No. 9, Sep. 2013; pp. 16571670.

Zhang, Fan; Liu, Feng; "Parallax-Tolerant Image Stitching"; 2014 IEEE Conference on Computer Vision and Pattern Recognition; 2014-06-23; IEEE; pp. 4321-4328.

\* cited by examiner

METHOD AND APPARATUS FOR IDENTIFYING SALIENT SUBIMAGES WITHIN A PANORAMIC IMAGE

TECHNICAL FIELD

An example embodiment relates generally to the processing and review of a panoramic image and, more particularly, to the identification of one or more salient subimages within the panoramic image that may be of interest to a viewer.

BACKGROUND

Panoramic images, such as 360° images, have a wide field of view and represent a large amount of information. While panoramic images are popular with viewers for a variety of purposes including virtual reality applications and other types of applications, the consumption of the large amount of content provided by a panoramic image can be challenging with it oftentimes becoming tedious for a viewer to examine the entire panoramic image. For example, it may be difficult or at least be less intuitive and require more effort for a viewer to examine those portions of the panoramic image which lie behind the viewer.

The challenges associated with the consumption of the large amounts of information provided by a panoramic image are exacerbated in instances in which a panoramic image is viewed on a device that has not been specifically designed for the display of a panoramic image, such as a smartphone, a television monitor, a computer monitor or the like. In this regard, devices that have not been specifically designed to facilitate the consumption of the large amounts of information provided by a panoramic view do not generally permit the viewer to display the panoramic image in its entirety and the viewer must, instead, scroll to view other portions of the panoramic image. As such, at least some viewers have not fully consumed the content provided by a panoramic image such that the resulting user experience has been less fulsome than it could have been.

BRIEF SUMMARY

A method, apparatus and computer program product are provided in accordance with an example embodiment in order to facilitate the review of at least portions of a panoramic image and to increase the likelihood that a viewer consumes at least those portions of the panoramic image that are considered to be both interesting and of aesthetic value. In this regard, the more interesting and aesthetically pleasing portions of a panoramic image may be identified and those portions may be highlighted for a viewer. Additionally, two-dimensional images of the portions of the panoramic image that are determined to be more interesting and aesthetically pleasing may be generated such that a viewer, if so desired, can readily review at least these two-dimensional images with a display that is not specifically designed for the consumption of a panoramic image. Consequently, the method, apparatus and computer program product of an example embodiment enhance the user experience associated with the large amount of information provided by a panoramic image.

In an example embodiment, an apparatus is provided that includes at least one processor and at least one memory storing computer program code with the at least one memory and the computer program code configured to, with the processor, cause the apparatus to identify one or more regions within a panoramic image based on the saliency of the one or more regions. The at least one memory and the computer program code are configured to, with the processor, cause the apparatus to identify candidate subimages that at least partially overlap with at least one of the regions identified within the panoramic image. The at least one memory and the computer program code are further configured to, with the processor, cause the apparatus to score the candidate subimages based upon predefined criteria and to cause information for one or more of the candidate subimages to be provided based upon scores associated therewith, such as by causing information including positional parameters regarding the one or more candidate subimages to be stored in association with the panoramic image.

In order to identify the one or more regions within the panoramic image, the at least one memory and the computer program code are configured to, with the processor, cause the apparatus of an example embodiment to analyze the panoramic image in order to define the saliency map; and to detect one or more regions within the panoramic image that are most salient as defined by the saliency map. In order to identify the one or more regions within the panoramic image, the at least one memory and the computer program code are configured to, with the processor, cause the apparatus of an example embodiment to define one or more connected components within the panoramic image. Each connected component includes at least one region within the panoramic image that is detected to be the most salient. In an instance in which two or more regions within the panoramic image that are to be detected to be most salient overlap or abut, the at least one memory and the computer program code are configured to, with the processor, cause the apparatus to define a connected component so as to include the two or more regions that overlap or abut. The at least one memory and the computer program code are configured to, with the processor, cause the apparatus of this example embodiment to identify candidate subimages by identifying one or more candidate subimages that at least partially overlap with a respective connected component. In this regard, the at least one memory and the computer program code are further configured to, with the processor, cause the apparatus of this example embodiment to identify the candidate subimages by identifying the candidate subimages from among subimages at different locations and of different scales that at least partially overlap with a respective connected component.

The at least one memory and the computer program code are configured to, with the processor, cause the apparatus of this example embodiment to score the candidate subimages by ranking the candidate subimages identified for each connected component and to cause information for the one or more of the candidate subimages to be provided by causing at least one candidate subimage for each connected component to be recommended based upon the ranking. The at least one memory and the computer program code are further configured to, with the processor, cause the apparatus of an example embodiment to define one or more bounding boxes with each bounding box including a respective connected component and to separately repeat the identification of the one or more regions, the identification of the candidate subimages and the scoring of the candidate subimages for each bounding box.

In another example embodiment, a method is provided that includes identifying one or more regions within a panoramic image based upon the saliency of the one or more regions. The method of this example embodiment also includes identifying candidate subimages that at least partially overlap with at least one of the regions identified within the panoramic image. The method further includes scoring the candidate subimages based upon predefined criteria. Further, the method includes causing information for one or more of the candidate subimages to be provided based upon scores associated therewith, such as by causing information including positional parameters regarding the one or more candidate subimages to be stored in association with the panoramic image.

The method of an example embodiment identifies one or more regions within a panoramic image by analyzing the panoramic image in order to define a saliency map and detecting the one or more regions within the panoramic image that are most salient as defined by the saliency map. The method of this example embodiment identifies one or more regions within a panoramic image by defining one or more connected components within the panoramic image. Each connected component includes at least one region within the panoramic image that is detected to be most salient. In an instance in which two or more regions within the panoramic image that are detected to be most salient overlap or abut one another, the method of this example embodiment defines a connected component so as to include the two or more regions that overlap or abut. The method of this example embodiment identifies the candidate subimages by identifying one or more candidate subimages that at least partially overlap with the respective connected component. The method of this example embodiment identifies the candidate subimages by identifying the candidate subimages from among subimages at different locations and of different scales that at least partially overlap with the respective connected component. The method of an example embodiment scores the candidate subimages by ranking the candidate subimages identified for each connected component and causes information for the one or more of the candidate subimages to be provided by causing at least one candidate subimage for each connected component to be recommended based upon the ranking. The method of an example embodiment also includes defining one or more bounding boxes with each bounding box including a respective connected component. The method of this example embodiment also includes separately repeating the identification of one or more regions, the identification of the candidate subimages and the scoring of the candidate subimages for each bounding box.

In a further example embodiment, a computer program product is provided that includes at least one non-transitory computer-readable storage medium having computer-executable program code instructions stored therein with the computer-executable code instructions including program code instructions configured to identify one or more regions within a panoramic image based upon the saliency of the one or more regions. The computer-executable program code instructions also include program code instructions configured to identify candidate subimages that at least partially overlap with at least one of the regions identified within the panoramic image. The computer-executable program code instructions further include program code instructions configured to score the candidate subimages based upon predefined criteria and program code instructions configured to cause information for the candidate subimages to be provided based upon scores associated therewith.

In yet another example embodiment, an apparatus is provided that includes means for identifying one or more regions within a panoramic view based upon a saliency of the one or more regions. The apparatus also includes means for identifying candidate subimages that at least partially overlap with at least one other region identified in a panoramic image. The apparatus further includes means for scoring the candidate subimages based upon predefined criteria and means for causing information for one or more of the candidate subimages to be provided based upon scores associated therewith.

In an example embodiment, an apparatus is provided that includes at least one processor and at least one memory storing computer program code with the at least one memory and computer program code configured to, with the processor, cause the apparatus to at least identify candidate subimages that at least partially overlap with at least one region identified within a panoramic image based upon the saliency of the at least one region. The at least one memory and the computer program code are also configured, with the processor, to cause the apparatus to score the candidate subimages based upon a criteria that takes into account a correlation between categories of objects within the candidate subimages. The at least one memory and the computer program code are further configured to, with the processor, cause the apparatus to cause information for one or more of the candidate subimages to be provided based upon scores associated therewith.

In order to score the candidate subimages, the at least one memory and the computer program code are configured to, with the processor, cause the apparatus of an example embodiment to score the candidate subimages based upon the criteria that utilizes information regarding different types of features.

The at least one memory and the computer program code are configured to, with the processor, cause the apparatus of an example embodiment to define, for a set of object descriptors $X=[x_1,x_2,\ldots,x_n]$ and different categories $C=[c_1, c_2, \ldots, c_m]$, a model for each category of object as follows:

$$\min_W \left( \mathbb{L}(W, X; Y) - \alpha Tr(WFF^T W^T) + \lambda \sum_{d=1}^{D} \sum_{l=1}^{L} \|w_d^{S_l}\|_2 \right)$$

subject to $r(M)=k, M \leq I, M \in S_+^m$ wherein $\mathbb{L}(W, X; Y)$ is a loss function, wherein $Tr(WFF^T W^T)$ enforces a clustering procedure on model $W=[w_1,w_2,\ldots,w_n]$ to cluster the models according to correlations therebetween, wherein $\sum_{d=1}^{D}\sum_{l=1}^{L}\|w_d^{S_l}\|_2$ enforces a $l_{2,1}$ norm on each model cluster $w_d^{S_l}$ for joint feature selection with $S_l$ being an index of the clusters, wherein $W \in R^{d \times m}$ is a project model in which each column $w_i \in R^d$ represents a d-dimensional projection vector for each category, and wherein $X \in R^{d \times n}$ is a data matrix which contains n samples, Y is the corresponding label information of X and F is a membership matrix identifying a cluster to which each $w_i$ belongs.

The criteria utilized to score the candidate subimages is determined, in accordance with an example embodiment, for a set of objects $X=[x_1, x_2, \ldots, x_n]$ with each object being described by multiple types of descriptors $X^{(1)}, X^{(2)}, \ldots, X^{(v)}$ in which $X^{(i)}=[x_1^{(i)}, x_2^{(i)}, \ldots, x_n^{(i)}]$ is the i-th descriptor and $x_j^{(1)}, x_j^{(2)}, \ldots, X_j^{(v)}$ describe the same object j from different views, based upon a model as follows:

$$\sum_{i=1}^{v} \mathbb{L}(w^{(i)}, H^{(i)}; y) + \sum_{i=1}^{v} \alpha_i \|X^{(i)} - D^{(i)} H^{(i)}\|_F^2 + \sum_{i=1}^{v} \beta_i \|H^{(i)} - H^*\|_F^2$$

subject to $\forall 1 \leq k \leq K, \|D_k^{(i)}\|_1 = 1$;
$D^{(i)}, H^{(i)}, H^* \geq 0$ wherein $w^{(i)} \in R^d$ is the projection vector of the i-th view and $\Sigma_{i=1}^{v} \mathbb{L}(w^{(i)}, H^{(i)}; y)$ is a linear combination of loss functions from different views, wherein $\Sigma_{i=1}^{v} \|X^{(i)} - D^{(i)} H^{(i)}\|_F^2$ learns a dictionary $D^{(i)} \in R_+^{m \times d}$ for each view by non-negative factorization, wherein $H^{(i)} \in R_+^{d \times n}$ is the coding of $X^{(i)} \in R_+^{m \times n}$ corresponding to the dictionary $D^{(i)}$ which is usable as a new feature set of data samples with $H^{(i)}$ being in a lower dimension than $X^{(i)}$ in an instance in which d<m, and wherein $\Sigma_{i=1}^{v} \|H^{(i)} - H^*\|_F^2$ provides for correlation maximization among different views.

In another example embodiment, a method is provided that includes identifying candidate subimages that at least partially overlap with at least one region identified within a panoramic image based upon a saliency of the at least one region. The method of this example embodiment also scores the candidate subimages based upon the criteria that takes into account a correlation between categories of objects within the candidate subimages. For example, the method may score the candidate subimages based upon the criteria that utilizes information regarding different types of features. The method further includes causing information for one or more of the candidate subimages to be provided based upon scores associated therewith.

In a further example embodiment, a computer program product is provided that includes at least one non-transitory computer-readable storage medium having computer-executable program code instructions stored therein with the computer-executable program code instructions including program code instructions configured to identify candidate subimages that at least partially overlap with at least one region identified within a panoramic image based upon a saliency of the at least one region. The computer-executable program code instructions also include program code instructions configured to score the candidate subimages based upon a criteria that takes into account a correlation between categories of objects within the candidate subimages. For example, the candidate subimages may be scored based upon the criteria that utilizes information regarding different types of features. The computer-executable program code instructions further include program code instructions configured to cause information for one or more of the candidate subimages to be provided based upon scores associated therewith.

In yet another example embodiment, an apparatus is provided that includes means for identifying candidate subimages that at least partially overlap with at least one region identified within a panoramic image based upon the saliency of at least one region. The apparatus also includes means for scoring the candidate subimages based upon a criteria that takes into account a correlation between categories of objects within the candidate subimages. The apparatus further includes means for causing information for one or more of the candidate subimages to be provided based upon the scores associated therewith.

BRIEF DESCRIPTION OF THE DRAWINGS

Figure 1B:
Figure 1A:
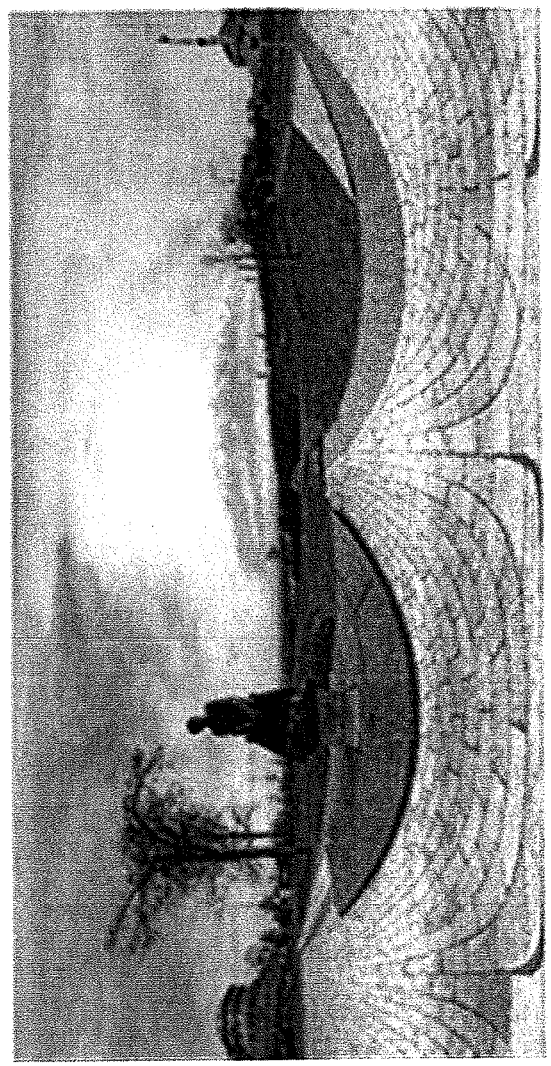
Figure 2:
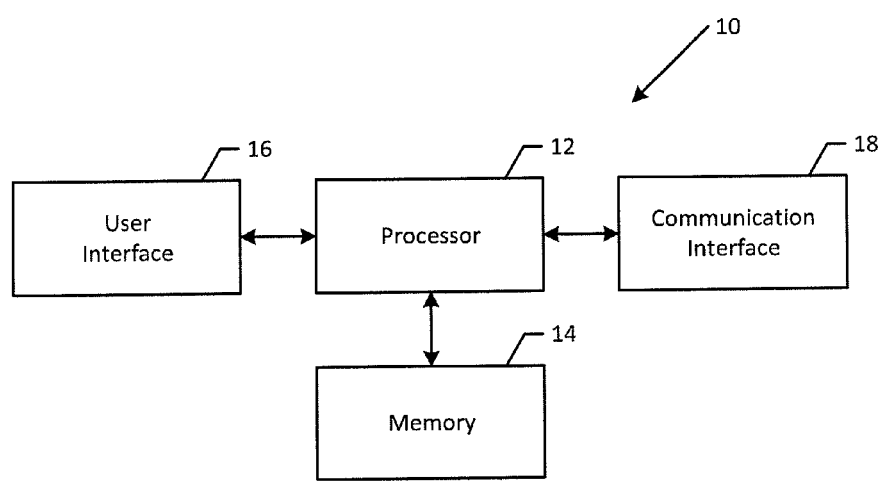
Figure 3:
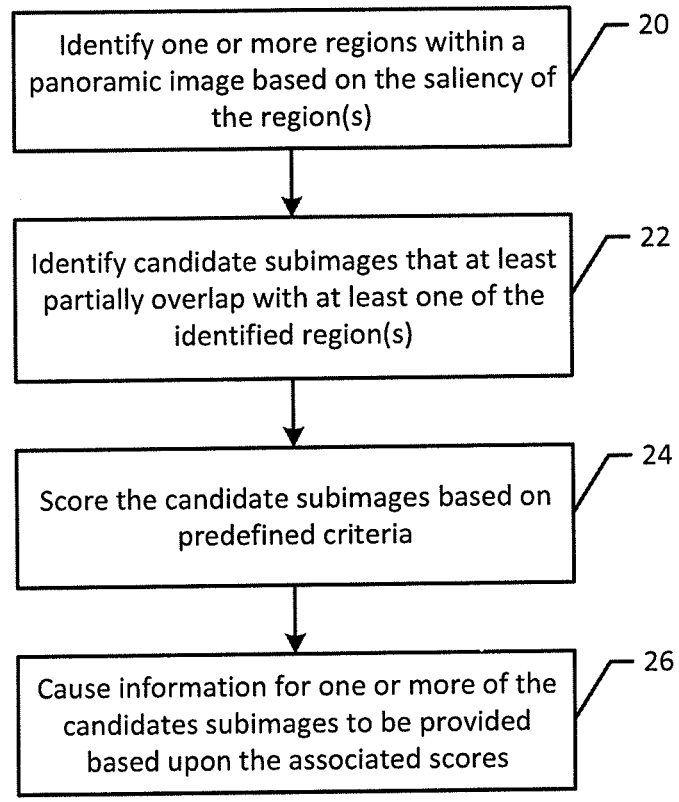
Figure 4:
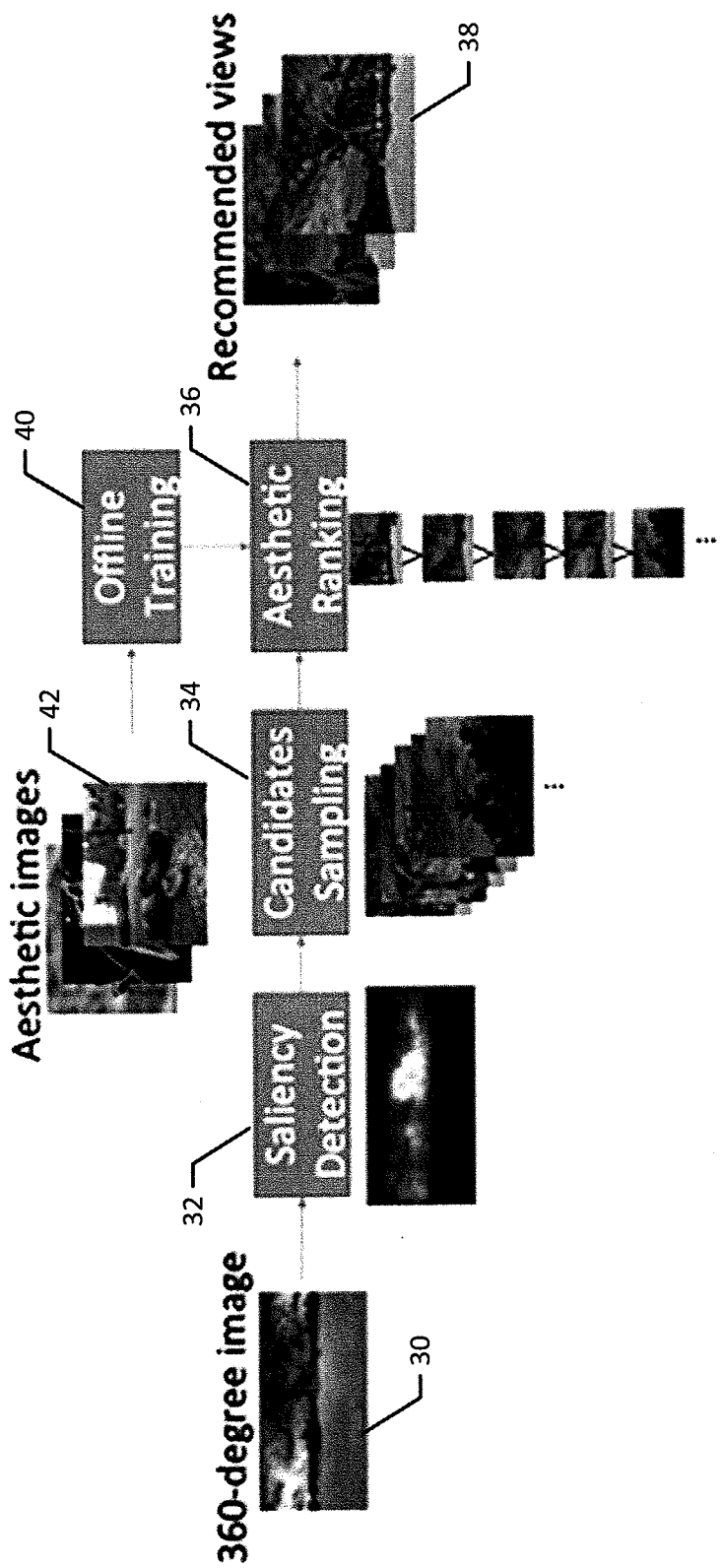
Figure 5:
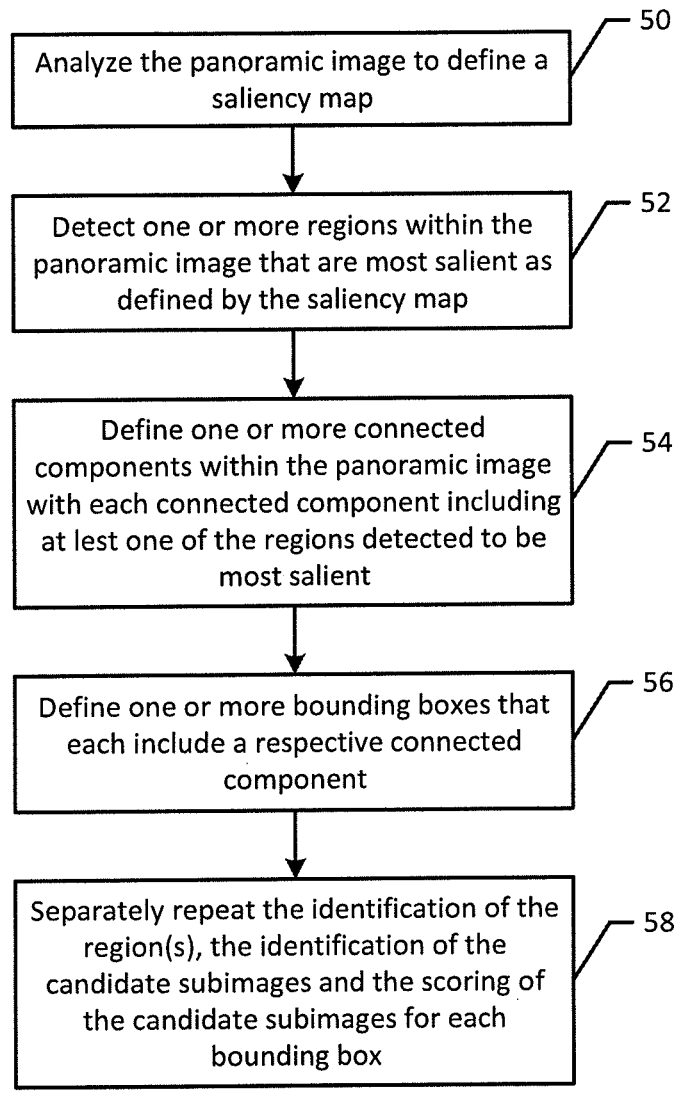
Figure 6:
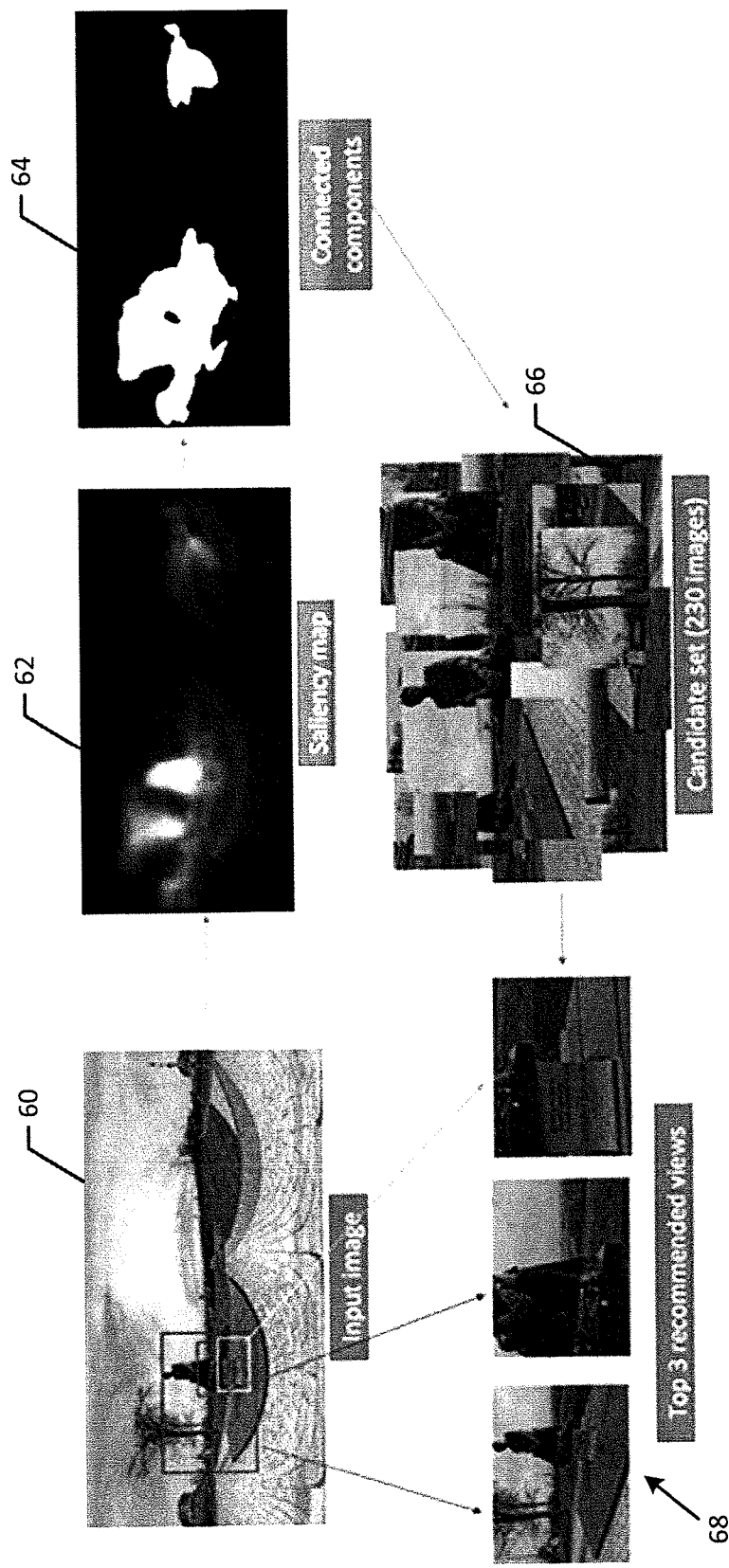

Having thus described certain example embodiments of the present disclosure in general terms, reference will hereinafter be made to the accompanying drawings, which are not necessarily drawn to scale, and wherein:

FIG. 1A is an example of a panoramic image;

FIG. 1B are examples of three candidate subimages from the panoramic image of FIG. 1 A that were identified, for example, to be of interest and to have aesthetic value in accordance with an example embodiment of the present invention;

FIG. 2 is a block diagram of an apparatus that may be specifically configured in accordance with an example embodiment of the present invention;

FIG. 3 is a flow chart illustrating operations performed, such as by the apparatus of FIG. 2, in accordance with an example embodiment of the present invention;

FIG. 4 is an overview of the operations performed, such as by the apparatus of FIG. 2, in accordance with an example embodiment of the present invention;

FIG. 5 is a flow chart illustrating operations performed, such as by the apparatus of FIG. 2, in accordance with another example embodiment of the present invention; and FIG. 6 is a visual representation of a panoramic image and other images and subimages that are generated at various stages in accordance with an example embodiment to the present invention.

DETAILED DESCRIPTION

Some embodiments will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (e.g., volatile or non-volatile memory device), can be differentiated from a "computer-readable transmission medium," which refers to an electromagnetic signal.

A method, apparatus and computer program product are provided in accordance with an example embodiment in order to identify particular regions within a panoramic image, such as regions that include features that are of interest and are of meaningful aesthetic value, such as by being aesthetically pleasing. As such, the method, apparatus and computer program product of an example embodiment may identify subimages from within the panoramic image that capture particular regions of the panoramic image that have been identified, such as those regions within the panoramic image that are of interest and that have meaningful aesthetic value. These subimages may then be recommended or otherwise provided to a viewer to increase the likelihood that the viewer will at least consider the subimages that have been identified and correspondingly consume at least that portion of the content of the panoramic image that has been identified to be of interest and of meaningful aesthetic value. In an example embodiment, the subimages that are identified may be provided in a manner that facilitates the display of the subimages by a device, such as a smart phone, a television monitor, a computer monitor or the like, that has not been specifically designed for the display of a panoramic issue. As such, the method, apparatus and computer program product of an example embodiment may enhance the user experience of a viewer of a panoramic image, such as in conjunction with a virtual reality application or any other type of application that utilizes panoramic images.

By way of example, FIG. 1A depicts a panoramic image. The panoramic image may be utilized in conjunction with a variety of applications, such as in conjunction with virtual reality applications. In the example embodiment, the panoramic image provides a 360° field of view. However, a panoramic image need not provide a 360° field of view, but may provide a more limited field of view that is still larger than the field of view of a person at the same location from which the panoramic image was captured. For example, the panoramic image may define a 270° field of view in some embodiments. The panoramic image may have various shapes, such as cylindrical or spherical. Further, the panoramic image may be a still image or a frame of a video consisting of a plurality of sequential frames.

A panoramic image includes a substantial amount of information that may be challenging for a viewer to consume, particularly on a device that is not specifically designed to support the viewing of panoramic images. As such, the method, apparatus and computer program product of an example embodiment is configured to identify particular regions within the panoramic image, such as regions that are considered to be of interest and to have a meaningful aesthetic value. Subimages may be defined from within the panoramic image that capture the regions that have been identified. In this regard, FIG. 1B depicts three subimages that capture regions from within the panoramic image that were determined to be of interest and to have the greatest aesthetic value, such as by being considered the most aesthetically pleasing. As such, a viewer may review the subimages and, as a result, at least be exposed to those regions of the panoramic image that are considered to be of interest and of meaningful aesthetic value, even if the viewer reviews little or any of the remainder of the panoramic image.

As noted above, an apparatus 10 is provided in order to identify candidate subimages from a panoramic image. The apparatus may be configured in various manners. For example, the apparatus may be embodied by a computing device carried by or otherwise associated with an immersive user interface, such as may, in turn, be embodied by a head-mounted device, such as virtual reality goggles or another type of virtual reality system. Alternatively, the apparatus may be embodied by a computing device, separate from the immersive user interface, but in communication therewith. Still further, the apparatus may be embodied in a distributed manner with some components of the apparatus embodied by the immersive user interface and other components of the apparatus embodied by a computing device that is separate from, but in communication with, the immersive user interface. In those example embodiments in which the apparatus is embodied, either entirely or partly, so as to be separate from, but in communication with the immersive user interface, the apparatus may be embodied by any of a variety of computing devices, including, for example, a mobile terminal, such as a portable digital assistant (PDA), mobile telephone, smartphone, pager, mobile television, gaming device, laptop computer, camera, tablet computer, touch surface, video recorder, audio/video player, radio, electronic book, positioning device (e.g., global positioning system (GPS) device), or any combination of the aforementioned, and other types of voice and text communications systems. Alternatively, the computing device may be a fixed computing device, such as a personal computer, a computer workstation, a server or the like.

Regardless of the manner in which the apparatus is embodied, the apparatus of an example embodiment is configured to include or otherwise be in communication with a processor 12 and a memory device 14 and optionally the user interface 16 and/or a communication interface 18. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As described above, the apparatus 10 may be embodied by a computing device. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 12 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 12 may be configured to execute instructions stored in the memory device 14 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a pass-through display or a mobile terminal) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

In some embodiments, the apparatus 10 may optionally include a user interface 16 that may, in turn, be in communication with the processor 12 to provide output to the user and, in some embodiments, to receive an indication of a user input. As such, the user interface may include a display and, in some embodiments, may also include a keyboard, a mouse, a joystick, a touch screen, touch areas, soft keys, a microphone, a speaker, or other input/output mechanisms. Alternatively or additionally, the processor may comprise user interface circuitry configured to control at least some functions of one or more user interface elements such as a display and, in some embodiments, a speaker, ringer, microphone and/or the like. The processor and/or user interface circuitry comprising the processor may be configured to control one or more functions of one or more user interface elements through computer program instructions (e.g., software and/or firmware) stored on a memory accessible to the processor (e.g., memory device 14, and/or the like).

The apparatus 10 may optionally also include the communication interface 18. The communication interface may be any means such as a device or circuitry embodied in either hardware or a combination of hardware and software that is configured to receive and/or transmit data from/to a network and/or any other device or module in communication with the apparatus. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

Referring now to FIG. 3, the operations performed by the apparatus 10 of FIG. 2 in accordance with an example embodiment of the present invention are depicted. As shown in block 20, the apparatus of an example embodiment includes means, such as the processor 12 or the like, for identifying one or more regions within a panoramic image based upon the saliency of the one or more regions. As shown in FIG. 4, for example, a panoramic image, such as a panoramic image having a 360° field of view, is provided as shown by block 30. Thereafter, region(s) within the panoramic image are identified based upon the saliency of the region(s) as shown at block 32.

Although the region(s) within the panoramic image may be identified based upon the saliency of the region(s) in various manners, the operations performed by the apparatus 10 of an example embodiment in order to identify the region(s) within the panoramic image based upon the saliency of the region(s) are depicted in FIG. 5. As shown in block 50 of FIG. 5, the apparatus of this example embodiment includes means, such as the processor 12 or the like, for analyzing the panoramic image in order to define its saliency map. The saliency map of a panoramic image may be generated in various manners including, for example, the technique described by Stas Goferman, et al., *Context-Aware Saliency Detection*, IEEE Trans. Pattern Anal. Mach. Intell. 34, 10 (October 2012), pp. 1915-1926. In an example embodiment, the saliency map may associate a value with each pixel or group of pixels that is representative of a measure of saliency of the pixel or group of pixels. The saliency map may create a visual representation of the saliency of the pixels or groups of pixels with the pixel value representative of a measure of saliency of the respective pixel or group of pixels. By way of example, the visual representation of the saliency of the panoramic image of block 30 of FIG. 4 is depicted in block 32, which identifies the most salient pixels with a white color, the least salient pixels with a black color and pixels of intermediate levels of saliency with gray colors ranging from black representative of less salient to white representative of more salient.

As shown in block 52 of FIG. 5, the apparatus 10 of this example embodiment also includes the means, such as the processor 12 or the like, for detecting the one or more regions within the panoramic image that are most salient as defined by the saliency map. In order to detect the one or more regions within the panoramic image that are most salient, the apparatus, such as the processor, of this example embodiment may identify those regions within the panoramic image for which the saliency value as defined by the saliency map satisfies predefined criteria, such as by equaling or exceeding a predefined saliency threshold. By having identified one or more regions within the panoramic image based upon the saliency of the region(s), those regions that are considered to be of most interest, such as defined by the technique of generating the saliency map, will have been identified.

Returning now to FIG. 3 and as shown in block 22, the apparatus 10 of an example embodiment also includes means, such as the processor 12 or the like, for identifying candidate subimages that at least partially overlap with at least one of the regions identified within the panoramic image. The candidate subimages may be identified in various manners. For example, a window that defines a subimage may be repeatedly repositioned throughout the panoramic image and a determination as to whether the subimage defined by the window qualifies as a candidate subimage is made. In this regard, the apparatus, such as the processor, may define a window of a predefined size and may repeatedly position the window at different locations within the panoramic image with the subimage defined by the window at each different location being evaluated in order to identify candidate subimages that at least partially overlap with at least one of the regions identified within the panoramic image. In an example embodiment, the apparatus, such as the processor, may be configured to repeat this process for windows having different sizes or different scales with the window of each different size or scale being positioned at a plurality of different locations within the panoramic image in order to identify those candidate subimages defined by the window that at least partially overlap with one of the regions identified within the panoramic image.

In order to qualify a subimage as defined by a window as a candidate subimage, the apparatus 10 of an example embodiment, such as the processor 12, may be configured to require not just any overlap between the subimage defined by the window and a region of interest that has been identified within the panoramic image, but to require a significant overlap between the subimage and at least one of the regions of interest. By way of example, the apparatus, such as the processor, may define a significant overlap to correspond to at least a predefined percentage of the pixels of the subimage defined by the window overlapping with (or including) at least one region of interest identified in the panoramic image. Thus, in an instance in which the subimage defined by the window overlaps with a region of interest identified within the panoramic image such that at least the predefined percentage of pixels of the subimage correspond to or overlap with the region of interest identified within the panoramic image, the subimage defined by the window may be identified as a candidate subimage. However, in an instance in which the subimage defined by the window overlaps slightly with a region identified within the panoramic image such that the percentage of pixels of the subimage that overlap or that correspond to the region identified to be of interest is less than the predefined percentage, the subimage will not be identified as a candidate subimage. By way of example, block 34 of FIG. 4 illustrates the identification of a plurality of candidate subimages that significantly overlap with at least one of the regions identified within the panoramic image.

As shown in block 24 of FIG. 3, the apparatus 10 of an example embodiment further includes means, such as the processor 12 or the like, for scoring the candidate subimages based upon predefined criteria. In this regard, the apparatus, such as the processor, may be configured to score the candidate subimages by ranking the candidate subimages based upon the predefined criteria such that the candidate subimage that most fully satisfies the predefined criteria is ranked the highest, while the candidate subimage that least satisfies the predefined criteria is ranked the lowest. In this regard, block 36 of FIG. 4 depicts the scoring, including the ranking, of a plurality of candidate subimages.

The candidate subimages may be scored in accordance with a variety of different types of predefined criteria. In an example embodiment, however, the predefined criteria represents an aesthetic value, such that candidate subimages having a higher aesthetic value would be considered more aesthetically pleasing while candidate subimages having a lower aesthetic value would be considered less aesthetically pleasing. In an example embodiment, the apparatus 10, such as the processor 12, may utilize a computational aesthetics scoring algorithm, such as described by Luca Marchesotti, et al., *Assessing the aesthetic quality of photographs using generic image descriptors*, International Conference on Computer Vision (ICCV '11), Washington, DC, USA, pp. 1784-1791 (2011), in order to score the candidate subimages based upon predefined criteria established by the computational aesthetics scoring algorithm.

In another example embodiment depicted in FIG. 4, the apparatus 10, such as the processor 12, may be trained, such as offline relative to the analysis of a panoramic image, so as to recognize images that are aesthetically pleasing relative to images that are less aesthetically pleasing and to correspondingly score the images based upon the relative degree of aesthetic value provided by a respective image. As such, a plurality of images, such as of different predefined aesthetic values, as shown at block 42 may be provided to the apparatus, such as the processor, in order to train the apparatus as shown at block 40 to recognize the features of an aesthetic image and to discriminate between images of different aesthetic value.

Once the candidate subimages have been scored and, in some embodiments, ranked, the apparatus 10 of an example embodiment also includes means, such as the processor 12 or the like, for causing information for one or more of the candidate subimages to be provided based upon the scores associated therewith. The candidate subimages for which information is provided may be defined in various manners. For example, the apparatus, such as the processor, may be configured to identify the candidate subimages for which information is to be provided to be each candidate subimage that has a score that satisfies, such as by exceeding, a predefined threshold. Alternatively, the apparatus, such as the processor, may be configured to identify a predefined number of the candidate subimages that have the highest scores and, therefore, the highest aesthetic value, for which to provide information. As shown in FIGS. 1B and 1n block 38 of FIG. 4, the three highest scoring candidate subimages may be identified and information related thereto may be provided.

As noted above, the panoramic image may be a still image or may be a frame of a video that includes a sequence of panoramic images. In an embodiment in which the panoramic image is a frame of a video, the apparatus 10, such as the processor 12, may be configured to identify the one candidate subimage having the highest score from each frame. An image file may then be constructed including the highest scoring candidate subimage of each frame of the video such that a viewer could view a representation of the video by viewing the sequence of candidate subimages that have been identified. Thus, even in an instance in which the viewer is utilizing a device that is not designed to display panoramic images, the viewer will be presented with the features that are considered to be of interest and to have the greatest aesthetic value from each frame of the video, such as in a slideshow.

The information for the one or more candidate subimages that is caused to be provided may be provided in various manners. For example, the information may be stored in memory 14, such as metadata associated with the panoramic image. A viewer subsequently watching the panoramic image may then select to view the one or more candidate subimages that were considered to be of interest and of the greatest aesthetic value with the candidate subimages being identified based upon the metadata associated with the panoramic image. Alternatively, the information for the one or more candidate subimages that is caused to be provided may be provided in the form of the candidate subimages themselves that are provided to a viewer for presentation thereto.

In an embodiment in which the information for the one or more candidate subimages is to be stored, such as as metadata associated with the panoramic image, the information may include positional parameters identifying the location of the candidate subimage within the panoramic image as well as, in some embodiments, the height and width of the candidate subimage. In this regard, the panoramic image may be a spherical or cylindrical projection. In order to identify the candidate subimages that at least partially overlap with at least one of the identified region(s) of interest within the panoramic image, the spherical or cylindrical panoramic image may be projected into a two dimensional plane with the center of projection located at the center of the sphere or cylinder. The window that defines the subimages may then be repositioned and evaluated relative to the two dimensional projection of the spherical or cylindrical panoramic image. In this example embodiment, the positional parameters that may be provided in conjunction with a candidate subimage may include not only the height and width of the candidate subimage, but also the theta, yaw and pitch of the projection from the spherical or cylindrical panoramic image onto the two dimensional plane in which theta, yaw and pitch are angular translations or projections about the y, z and x axes, respectively.

In order to increase the image processing efficiency, the apparatus 10, such as the processor 12, may be configured to utilize connected components. In this regard and as shown in block 54 of FIG. 5, the apparatus of this example embodiment includes means, such as the processor or the like, for identifying one or more for identifying one or more connected components within the panoramic image. In this regard, each connected component includes at least one region within the panoramic image that is detected to be the most salient. In an instance in which two or more regions within the panoramic image that are detected to be most salient, such as by having a saliency value that satisfies, such as by exceeding, a predefined saliency threshold overlap or abut one another, the apparatus also includes means, such as the processor or the like, for defining a connected component so as to include each of the two or more regions that overlap or abut. Thus, regions of interest that have been identified within a panoramic image based upon the saliency of the regions and that either overlap or abut one another can be combined into a single connected component, thereby increasing the efficiency with which the subsequent image processing operations may be performed. In this example embodiment, each region that has been identified within the panoramic image based upon the saliency of the regions is included in at least one of the connected components.

In this regard, FIG. 6 depicts an embodiment in which a panoramic image 60 is analyzed so as to define a saliency map as shown in block 62. Thereafter, connected components may be defined within the panoramic image based upon the overlapping or abutting relationship of regions within the panoramic image that have been identified as salient. A visual representation 64 of the connected components based upon the saliency map 62 is shown in FIG. 6. Thereafter, the set of candidate subimages may be identified as shown in block 66 and a subset of the candidate subimages may be identified based upon scoring (and ranking) all the candidate subimages as shown at block 68. In an embodiment in which connected components are defined, the apparatus 10, such as a processor 12, may then identify candidate subimages that at least partially overlap with at least one of the connected components prior to further processing the candidate subimages as described above.

In an example embodiment, the apparatus 10 further includes means, such as the processor 12 or the like, for defining one or more bounding boxes as shown in block 56 of FIG. 5. In this example embodiment, each bounding box includes a respective connected component and, as such, may be at least as large as the connected component or may be larger. In order to increase the granularity with which the subimages of interest and of aesthetic value are identified from within the panoramic image, each bounding box may be separately processed in accordance with the technique described above in conjunction with FIG. 3 in order to identify one or more subimages from within each bounding box that are considered to be of interest and of the greatest aesthetic value. Thus, the apparatus of this example embodiment also includes means, such as the processor or the like, for separately repeating the identification of the one or more regions for the portion of the image within the bounding box based upon the saliency of the region(s), the identification of the candidate subimages that at least partially overlap with at least one of the identified region(s) from within each bounding box and the scoring of the candidate subimages for each bounding box.

As such, a method, apparatus 10 and computer program product of this example embodiment may initially identify the more interesting and aesthetically pleasing regions within the overall panoramic image and may capture those regions within respective bounding boxes that are then separately analyzed in accordance with the same process in order to identify one or more candidate subimages within each bounding box that are of interest and of the greatest aesthetic value. The candidate subimages that are identified in accordance with this example embodiment may therefore be identified with increased granularity.

In order to improve the scoring of the candidate subimages, such as by improving the ranking the candidate subimages, the method, apparatus 10 and computer program product of an example embodiment may utilize information regarding the category of objects within the candidate subimages and/or multiple views, that is, multiple types of features. In this regard, for a set of objects where each object is described by a feature vector $x=[x_1, x_2, \ldots, x_n]$, the class of the object or order the objects is predicted according to a specific metric Y where $Y=f(X)$, and the class label for classification or the most relevant candidates are returned for ranking. While learning the function $f(\ )$ from input-output training data, the original feature space x may be projected to a new low dimension space X' to improve the classification/ranking performance.

As described above, a variety of different types of predefined criteria may be utilized in order to score the candidate subimages, such as by scoring candidate subimages based upon the relative aesthetic value of each candidate subimage. In an example embodiment, the apparatus 10 includes means, such as the processor 12 or the like, for scoring the candidate subimages based upon a criterion that takes into account the correlation between categories of objects within the candidate subimages. Various categories of objects may be defined. For example, objects utilizing different modes of transportation, such as walking, driving, cycling or the like may be separated into different categories. In this regard, information drawn from an image including one category of objects may be correlated to an image including a different type of object if the different types of objects have been correlated. Conversely, information drawn from an image including one type of object may not be correlated to another image including a different type of object if the different types of objects have not been correlated.

In an example embodiment, a model for each category of objects may be defined. In this regard, for a set of object descriptors $X=[x_1, x_2, \ldots x_n]$, together with different types of category information $C=[c_1, c_2, \ldots c_m]$, a model for each category may be as follows:

$$\min_W \left( \mathbb{L}(W, X; Y) - \alpha Tr(W, FF^T W^T) + \lambda \sum_{d=1}^{D} \sum_{i=1}^{L} \|w_d^{S_i}\|_2 \right)$$

Subject to $r(M)=k$, $M \leq I$, $M \in S_+^m$

In this regard, $W \in R^{d \times m}$ is the project model where each column $w_d \in R^d$ represents a d-dimensional projection vector for each category. $X \in R^{d \times n}$ is the data matrix, which contains n samples and $\gamma$ is the corresponding label information of X. F is a membership matrix identifying which cluster each $w_d$ belongs to. In addition, $\mathbb{L}(W, X:Y)$ is a loss function, e.g., least square loss, Bayesian expected loss, etc. $Tr(WFF^T W^T)$ enforces a clustering procedure on model $W=[w_1, w_2, \ldots w_n]$ to cluster the models according to the correlations. F indicates which cluster each category belongs to and $\Sigma_{d=1}^{D} \Sigma_{l=1}^{L} \|w_d^{S_i}\|_2$ enforces a $l_{2,1}$ norm on each model cluster $w_d^{S_i}$ for joint feature selection where $S_i$ is the index of the clusters.

The apparatus 10, such as the processor 12, of an example embodiment can be configured to optimize the model by optimizing F when fixing w. In this regard, given a fixed W, the optimization problem can be simplified as follows:

$$\max_{F^T F = I_k} Tr(WFF^T W^T)$$

subject to $Tr(FF^T)=k$, $FF^T \leq I$, $FF^T \in S_+^m$

According to Ky Fan matrix inequality, let $H=W^T$ $W=PD \cdot P^T \in R^{m \times m}$ be the eigen decomposition and $p_1, \ldots, p_k$, be the eigenvectors corresponding to the k largest eigen values. The membership matrix F can be updated as $F=[p_1, \ldots, p_k]$.

Additionally or alternatively, the apparatus 10, such as the processor 12, of an example embodiment may be configured to optimize the model by optimizing w when fixing F. In this regard, an upper bound of the squared $l_{2,1}$ norm in terms of some positive dummy variables $\delta_i \in R^+ (1=1, 2, \ldots, d)$ may be defined as:

$$(\|W\|_{2,1})^2 = \left( \sum_{i=1}^{d} \|w^i\|_2 \right)^2 \leq \sum_{i=1}^{d} \frac{(\|w^i\|_2)^2}{\delta_i}$$

Thus $\delta_i$ can be updated by holding the equality:

$$\delta_i = \frac{\|w^i\|_2}{\sum_{j=1}^{d} \|w^j\|_2}, i = 1, 2, \ldots, d.$$

Thus, w can be optimized by gradient descent of the following formulation:

$$\min_W \left( \mathbb{L}(W, X; Y) - \alpha Tr(WFF^T W^T) + \lambda \sum_{i=1}^{d} \frac{(\|w^i\|_2)^2}{\delta_i} \right)$$

In another example embodiment, the apparatus 10 may include means, such as the processor 12 or the like, for scoring the candidate subimages based upon a criterion that utilizes information regarding different types of features, thereby optimizing the selection of a classifier. A variety of different types of features may be identified, such as color, texture or the like. In this example embodiment, information regarding an image that is based upon an image including one type of feature may be correlated to images having a different type of feature if a correlation has been established between the different types of features. Conversely, information drawn from an image including one type of feature may not be correlated to another image including a different type of feature if the different types of features have not been correlated.

In an example embodiment, the criteria utilized to score the candidate subimages may be determined, for a set of objects $X=[x_1, x_2, \ldots x_n]$ that is described by multiple types of descriptors $X^{(1)}, X^{(2)}, X^{(V)}$ where $X^{(i)}=[x_1^{(i)}, x_2^{(i)}, \ldots x_n^{(i)}]$ is the i-th descriptor and $x_j^{(1)}, x_j^{(2)}, \ldots x_j^{(v)}$ describes the same object j from different views, in accordance with a model for supervised multi-view feature learning as follows:

$$\sum_{i=1}^{v} \mathbb{L}(w^{(i)}, H^{(i)}; y) + \sum_{i=1}^{v} \alpha_i \|X^{(i)} - D^{(i)} H^{(i)}\|_F^2 + \sum_{i=1}^{v} \beta_i \|H^{(i)} - H^*\|_F^2$$

Subject to $\forall 1 \leq k \leq K$, $\|D_k^{(i)}\|_1 = 1$;

$D^{(i)}, H^{(i)}, H^* \geq 0$

In this regard, $w^{(i)} \in R^d$ is the projection vector of the i-th view and $\Sigma_{i=1}^{v} \mathbb{L}(w^{(i)}, H^{(i)}; y)$ is a linear combination of loss functions from different views. $L(w^{(i)}, H^{(i)}, y^{(i)})$ can be any type of loss function, e.g., least square loss, Bayesian expected loss, etc. In addition, $\Sigma_{i=1}^{v} \|X^{(i)} - D^{(i)} H^{(i)}\|_F^2$ learns a dictionary $D^{(i)} \in R_+^{m \times d}$ for each view by non-negative factorization. $H^{(i)} \in R_+^{d \times n}$ is the coding of $x^{(i)} \in R_+^{m \times n}$ corresponding to the dictionary $D^{(i)}$, which can be used as the new feature set of data samples. $H^{(i)}$ is in lower dimension than $X^{(i)}$ if $d < m$. In order to provide for correlation maximization among different views, $\Sigma_{i=1}^{v} \|H^{(i)} - H^*\|_F^2$; enforces different views that share similar codings such that different views may be decided by similar words in the dictionary. This similarity captures the correlation among different views.

In order to optimize the model for supervised multi-view feature learning, let $Q^{(v)} = Diag(\Sigma_{i=1}^{M} D_{i,1}^{(v)}, \Sigma_{i=1}^{M} D_{i,2}^{(v)}, \ldots \Sigma_{i=1}^{M} D_{i,K}^{(v)})$ where $Diag(.)$ denotes a diagonal matrix with non-zero elements equal to the values in the parenthesis. Thus, the function can be reformulated as:

$$\sum_{i=1}^{v} \mathbb{L}(w^{(i)}, H^{(i)}; y) + \sum_{i=1}^{v} \alpha_i \|X^{(i)} - D^{(i)} H^{(i)}\|_F^2 + \sum_{i=1}^{v} \beta_i \|H^{(i)} Q^{(i)} - H^*\|_F^2$$

Subject to $D^{(i)}$, $H^{(i)}$, $H^* \geq 0$

As part of the optimization, after fixing w, $H^*$ and $H^{(v)}$, the apparatus 10, such as the processor 12, may be configured to compute $D^{(V)}$. In this regard, $D^{(V)}$ can be updated by:

$$D_{i,k} \leftarrow D_{i,k} \frac{(XH)_{i,k} + \frac{\beta_i}{\alpha_i}\sum_{j=1}^{N} H_{j,k} H_{j,k}^*}{(DH^TH)_{i,k} + \frac{\beta_i}{\alpha_i}\sum_{i=1}^{M} D_{i,k}\sum_{j=1}^{N} H_{j,k}^2}$$

$D_{i,k}$ is the (i,k)-th element in matrix D of any view. Additionally or alternatively, after fixing w, H* and $D^{(v)}$, the apparatus 10, such as the processor 12, may be configured to compute $H^{(V)}$. In this regard, the formulation for $H^{(V)}$ can be simplified as follows:

$$\mathbb{L}(w,h;y) + \alpha Tr(DH^THD^T - 2\times DH^T) + \beta Tr(HH^T - 2V(V^*)^T) + Tr(\Phi H)$$

In addition, the apparatus 10, such as the processor 12, may be configured to update H by gradient descent. In this regard, W* and H* can be updated through gradient descent by fixing other variables.

In an example embodiment, the apparatus 10, such as the processor 12, may be configured to model multi-category multi-view feature learning as follows:

$$\sum_{i=1}^{v} \mathbb{L}(W^{(i)}, H^{(i)}; Y) + \sum_{i=1}^{v} \alpha_i \|W^{(i)} - D^{(i)}H^{(i)}\|_F^2 +$$

$$\beta \sum_{i=1}^{v} \|H^{(i)} - H^*\|_F^2 + \lambda \sum_{i=1}^{v} \sum_{d=1}^{D} \sum_{l=1}^{L} \|w_d^{S_{i,l}}\|_2$$

Subject to $\forall 1 \leq k \leq K, \|D_k^{(i)}\|_1 = 1;$
$D^{(i)}, H^{(i)}, H^* \geq 0$ In the foregoing model, the loss function: $\Sigma_{i=1}^{v}\mathbb{L}(W^{(i)}, H^{(i)}; Y)$ is the linear combination of the loss function from different views. $\mathbb{L}(W^{(i)},H^{(i)};Y)$ can be any type of loss function, e.g., least square loss, Bayesian expected loss, etc. In addition, $\Sigma_{i=1}^{v}\|W^{(i)}-D^{(i)}H^{(i)}\|_F^2$ imposes a clustering constraint on the model $W^{(i)}$ of each view. $D^{(i)}$ is the cluster centers and $H^{(i)}$ identifies the cluster membership. In order to maximize the view correlation, $\Sigma_{i=1}^{v}\|H^{(i)}-H^*\|_F^2$ enforces the cluster membership of the models from different views that are similar to each other. As such, for the same objects represented by different views, similar clustering structures exist among different views. Group feature selection is also provided by $\Sigma_{i=1}^{v}\Sigma_{d=1}^{D}\Sigma_{i=1}^{L}\|w_d^{S_{i,j}}\|_2$, which enforces a $l_{2,1}$ norm on each model cluster of each view $w_d^{S_{i,l}}$ for joint feature selection where $S_{i,l}$ is the index of the clusters.

In order to optimize the foregoing model of multi-category multi-view feature learning, the formulation can be reformed as:

$$\sum_{i=1}^{v} \mathbb{L}(W^{(i)}, X^{(i)}; Y) + \sum_{i=1}^{v} \alpha_i \|W^{(i)} - D^{(i)}H^{(i)}\|_F^2 +$$

$$\sum_{i=1}^{v} \beta_i \|H^{(i)}Q^{(i)} - H^*\|_F^2 + \lambda \sum_{i=1}^{v} \sum_{j=1}^{d} \frac{(\|w_j^i\|_2)^2}{\delta_j}$$

Subject to $D_i, H_i, H^* \geq 0$
where $Q^{(v)} = \text{Diag}(\Sigma_{i=1}^{M}D_{i,1}^{(v)}, \Sigma_{i=1}^{M}D_{i,2}^{(v)}, \ldots, \Sigma_{i=1}^{M}D_{i,k}^{(v)})$ and $$\delta_i = \frac{\|w^j\|_2}{\sum_{j=1}^{d}\|w^j\|_2}, i = 1, 2, \ldots, d.$$

The apparatus 10, such as the processor 12, is then configured to fix W, H* and $H^{(v)}$ and to compute $D^{(v)}$ as follows:

$$D_{i,k} \leftarrow D_{i,k} \frac{(WH)_{i,k} + \frac{\beta_i}{\alpha_i}\sum_{j=1}^{N} H_{j,k} H_{j,k}^*}{(DH^TH)_{i,k} + \frac{\beta_i}{\alpha_i}\sum_{i=1}^{M} D_{i,k}\sum_{j=1}^{N} H_{j,k}^2}$$

Additionally or alternatively, the apparatus 10, such as the processor 12, is configured to fix w, H* and $D^{(v)}$ and to compute $H^{(v)}$. In this regard, the formulation of $H^{(v)}$ can be simplified as follows:

$$\alpha Tr(DH^THD^T - 2XDH^T) + \beta Tr(HH^T - 2V(V^*)^T) + Tr(\Phi H)$$

The apparatus 10, such as the processor 12, can also be configured to update H as follows:

$$H_{j,k} \leftarrow H_{j,k} \frac{(W^TD)_{j,k} + \frac{\beta_i}{\alpha_i} H_{j,k}^*}{(HD^TD)_{j,k} + \frac{\beta_i}{\alpha_i} H_{j,k}}$$

The apparatus 10, such as the processor 12, can further be configured to update w and H* through gradient descent by fixing other variables.

In this example embodiment, the criteria by which the candidate subimages may be enhanced or optimized such that the candidate images that have the greatest aesthetic value may be identified with increased precision. As such, the user experience may be additionally enhanced by ensuring that a viewer will have ready access to the preferred subimages from within the panoramic image.

Regardless of the criteria employed to determine the aesthetic value, the method, apparatus 10 and computer program product facilitate the review of at least portions of a panoramic image, thereby increasing the likelihood that a viewer consumes at least those portions of the panoramic image that are considered to be both interesting and of aesthetic value. Moreover, the portions that are identified to be of interest and of aesthetic value may be presented as two-dimensional images so as to facilitate their presentation upon a wide variety of devices including those with a display that is not specifically designed for the consumption of a panoramic image.

As described above, FIGS. 3 and 5 illustrate flowcharts of an apparatus 10, method, and computer program product according to example embodiments of the invention. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by the memory device 14 of an apparatus employing an embodiment of the present invention and executed by the processor 12 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus comprising at least one processor and at least one memory storing computer program code, the at least one memory and the computer program code configured to, with the processor, cause the apparatus to at least:
   identify one or more regions within a panoramic image based upon a saliency of the one or more regions by analyzing the panoramic image in order to define a saliency map; detecting the one or more regions within the panoramic image that are most salient as defined by the saliency map; defining one or more connected components within the panoramic image, wherein each connected component includes at least one region within the panoramic image that is detected to be most salient; and, in an instance in which two or more regions within the panoramic image that are detected to be most salient overlap or abut one another, defining a connected component so as to include the two or more regions that overlap or abut;
   identify candidate subimages that at least partially overlap with at least one of the regions identified within the panoramic image;
   score the candidate subimages based upon predefined criteria; and
   cause information for one or more of the candidate subimages to be provided based upon scores associated therewith.

2. An apparatus according to claim 1 wherein the at least one memory and the computer program code are configured to, with the processor, cause the apparatus to identify candidate subimages by identifying one or more candidate subimages that at least partially overlap with a respective connected component.

3. An apparatus according to claim 2 wherein the at least one memory and the computer program code are configured to, with the processor, cause the apparatus to identify the candidate subimages by identifying the candidate subimages from among subimages at different locations and of different scales that at least partially overlap with a respective connected component.

4. An apparatus according to claim 2 wherein the at least one memory and the computer program code are configured to, with the processor, cause the apparatus to score the candidate subimages by ranking the candidate subimages identified for each connected component, and wherein the at least one memory and the computer program code are configured to, with the processor, cause the apparatus to cause information for the one or more of the candidate subimages to be provided by causing at least one candidate subimage for each connected component to be recommended based upon the ranking.

5. An apparatus according to claim 1 wherein the at least one memory and the computer program code are further configured to, with the processor, cause the apparatus to define one or more bounding boxes with each bounding box including a respective connected component, and to separately repeat the identification of one or more regions, the identification of the candidate subimages and the scoring of the candidate subimages for each bounding box.

6. An apparatus according to claim 1 wherein the at least one memory and the computer program code are configured to, with the processor, cause the apparatus to cause information for the one or more of the candidate subimages to be provided by causing information including positional parameters regarding the one or more candidate subimages to be stored in association with the panoramic image.

7. A method comprising:
   identifying one or more regions within a panoramic image based upon a saliency of the one or more regions by analyzing the panoramic image in order to define a saliency map; detecting the one or more regions within the panoramic image that are most salient as defined by the saliency map; defining one or more connected components within the panoramic image, wherein each connected component includes at least one region within the panoramic image that is detected to be most salient; and, in an instance in which two or more regions within the panoramic image that are detected to be most salient overlap or abut one another, defining a connected component so as to include the two or more regions that overlap or abut;

identifying candidate subimages that at least partially overlap with at least one of the regions identified within the panoramic image;

scoring the candidate subimages based upon predefined criteria; and causing information for one or more of the candidate subimages to be provided based upon scores associated therewith.

8. A method according to claim 7 wherein identifying candidate subimages comprises identifying one or more candidate subimages that at least partially overlap with a respective connected component.

9. A method according to claim 8 wherein identifying the candidate subimages comprises identifying the candidate subimages from among subimages at different locations and of different scales that at least partially overlap with a respective connected component.

10. A method according to claim 8 wherein scoring the candidate subimages comprises ranking the candidate subimages identified for each connected component, and wherein causing information for the one or more of the candidate subimages to be provided comprises causing at least one candidate subimage for each connected component to be recommended based upon the ranking.

11. A method according to claim 7 further comprising defining one or more bounding boxes with each bounding box including a respective connected component, and separately repeating the identification of one or more regions, the identification of the candidate subimages and the scoring of the candidate subimages for each bounding box.

12. A method according to claim 7 wherein causing information for one or more of the candidate subimages to be provided comprises causing information including positional parameters regarding the one or more candidate subimages to be stored in association with the panoramic image.

13. A computer program product comprising at least one non-volatile computer-readable storage medium having computer-executable program code instructions stored therein, the computer-executable program code instructions comprising program code instructions configured to:

identify one or more regions within a panoramic image based upon a saliency of the one or more regions by analyzing the panoramic image in order to define a saliency map; detecting the one or more regions within the panoramic image that are most salient as defined by the saliency map; defining one or more connected components within the panoramic image, wherein each connected component includes at least one region within the panoramic image that is detected to be most salient; and, in an instance in which two or more regions within the panoramic image that are detected to be most salient overlap or abut one another, defining a connected component so as to include the two or more regions that overlap or abut;

identify candidate subimages that at least partially overlap with at least one of the regions identified within the panoramic image;

score the candidate subimages based upon predefined criteria; and cause information for one or more of the candidate subimages to be provided based upon scores associated therewith.

14. An apparatus comprising at least one processor and at least one memory storing computer program code, the at least one memory and the computer program code configured to, with the processor, cause the apparatus to at least:

identify candidate subimages that at least partially overlap with at least one region identified within a panoramic image based upon a saliency of the at least one region;

score the candidate subimages based upon a criteria that takes into account a correlation between categories of objects within the candidate subimages; and cause information for one or more of the candidate subimages to be provided based upon scores associated therewith, wherein the at least one memory and the computer program code are configured to, with the processor, cause the apparatus to define, for a set of object descriptors $X=[x_1, x_2, \ldots, x_n]$ and different categories $C=[c_1, c_2, \ldots, c_m]$, a model for each category of object as follows:

$$\min_W \left( \mathbb{L}(W, X; Y) - \alpha Tr(WFF^T W^T) + \lambda \sum_{d=1}^{D} \sum_{l=1}^{L} \|w_d^{S_l}\|_2 \right)$$

subject to $r(M)=k, M \leq 1, M \in S_+^m$ wherein $\mathbb{L}(W, X; Y)$ is a loss function, wherein $Tr(WFF^T W^T)$ enforces a clustering procedure on model $W=[w_1, w_2, \ldots, w_n]$ to cluster the models according to correlations therebetween, wherein $\sum_{d=1}^{D} \sum_{L=1}^{L} \|w_d^{S_l}\|_2$ enforces a $l_{2,1}$ norm on each model cluster $w_d^{S_l}$ for joint feature selection with $S_l$ being an index of the clusters, wherein $W \in R^{d \times m}$ is a project model in which each column $w_d \in R^d$ represents a d-dimensional projection vector for each category, and wherein $X \in R^{d \times n}$ is a data matrix which contains n samples, Y is the corresponding label information of X and F is a membership matrix identifying a cluster to which each $w_d$ belongs.

15. An apparatus according to claim 14 wherein, to score the candidate subimages, the at least one memory and the computer program code are configured to, with the processor, cause the apparatus to score the candidate subimages based upon the criteria that utilizes information regarding different types of features.

16. An apparatus comprising at least one processor and at least one memory storing computer program code, the at least one memory and the computer program code configured to, with the processor, cause the apparatus to at least:

identify candidate subimages that at least partially overlap with at least one region identified within a panoramic image based upon a saliency of the at least one region;

score the candidate subimages based upon a criteria that takes into account a correlation between categories of objects within the candidate subimages; and cause information for one or more of the candidate subimages to be provided based upon scores associated therewith, wherein the criteria utilized to score the candidate subimages is determined, for a set of objects $X=[x_1, x_2, \ldots x_n]$ with each object being described by multiple types of descriptors $x^{(1)}, x^{(2)}, \ldots, x^{(v)}$ in which $X^{(i)}=[x_1^{(i)}, x_2^{(i)}, \ldots, x_n^{(i)}]$ is i-th descriptor and $x_j^{(1)}$, $x_j^{(2)}, \ldots, x_j^{(v)}$ describe the same object j from different views, based upon a model as follows:

$$\sum_{i=1}^{v} L(w^{(i)}, H^{(i)}; y) + \sum_{i=1}^{v} \alpha_i \|X^{(i)} - D^{(i)} H^{(i)}\|_F^2 + \sum_{i=1}^{v} \beta_i \|H^{(i)} - H^*\|_F^2$$

subject to $\forall 1 \leq k \leq K, \|D_k^{(i)}\|_1 = 1$.
$D^{(i)}, H^{(i)}, H^* \geq 0$.

* * * * *